United States Patent

Saeki et al.

Patent Number: 4,694,028
Date of Patent: Sep. 15, 1987

[54] MANUFACTURING METHOD FOR PHENOL RESIN FOAM

[75] Inventors: Yukio Saeki; Naomitsu Inoue; Yukio Tokunaga, all of Fujieda, Japan

[73] Assignee: Sumitomo Durez Company, Ltd., Tokyo, Japan

[21] Appl. No.: 859,670

[22] Filed: Apr. 5, 1986

[51] Int. Cl.$^4$ ................................. C08V 9/14
[52] U.S. Cl. ................... 521/110; 521/114; 521/181
[58] Field of Search ............ 521/110, 114, 181

[56] References Cited

U.S. PATENT DOCUMENTS

| | | | |
|---|---|---|---|
| 4,033,910 | 7/1977 | Papa | 521/181 |
| 4,067,829 | 1/1978 | Garrett | 521/181 |
| 4,176,216 | 11/1979 | Reid | 521/181 |
| 4,207,400 | 6/1980 | Dahms | 521/181 |
| 4,207,401 | 6/1980 | Dahms | 521/181 |
| 4,216,295 | 8/1980 | Dahms | 521/181 |
| 4,233,361 | 11/1980 | Fultz | 521/181 |
| 4,303,758 | 12/1981 | Gusmer | 521/181 |
| 4,444,912 | 4/1984 | Carlson et al. | 521/181 |
| 4,478,958 | 10/1984 | Carlson et al. | 521/181 |
| 4,530,939 | 7/1985 | Rickle | 521/181 |

Primary Examiner—Morton Foelak
Attorney, Agent, or Firm—James F. Tao; James F. Mudd

[57] ABSTRACT

This invention is concerned with a method for producing phenol resin foam possessing a compact cellular structure, a high closed cell ratio and improved heat resistance. The method consists of using a resole type phenolic resin having a number average molecular weight of 150–400, surface active agents, blowing agents and curing agents, wherein at least two surface active agents are chosen from general formulas A and B, but a selection of each type must be employed

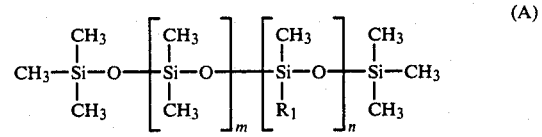

(A)

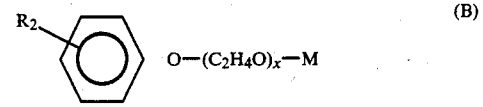

(B)

where $R_1$ is a saturated aliphatic hydrocarbon group of 8–14 carbon atoms and/or a 2-phenylpropyl group, and m and n are integers and meet the requirement:

$$\frac{n}{n+m} = 0.2 - 0.9,$$

$R_2$ is a saturated aliphatic hydrocarbon group of 4–12 carbon atoms, M is a hydrogen atom or $SO_2Na$, and x is an integer of 4–110.

10 Claims, No Drawings

MANUFACTURING METHOD FOR PHENOL RESIN FOAM

BACKGROUND OF THE INVENTION

This invention relates to a manufacturing method for a phenolic resol type resin foam having compact cellular structure, a high closed cell ratio and good heat resistance.

It is known that the cellular structure of phenolic resol type foams are affected by the type and mixing ratio of the phenol resins, the surface active agents, the blowing agent, the curing agents, and the like. Also the foaming conditions such as a temperature etc., and above all, the type and mixing amount of surface active agents used affect the structure of the foam. Hitherto, as methods to obtain resol foams having a high closed-cell ratio, there are known methods of using a siloxane-oxyalkylene copolymer as the surface active agent, Japanese Patent Publication No. 15874/1970. A method of using a adduct of p-nonylphenol with an alkylene oxide as the surface active agent is known, Japanese Laid-Open Patent Publication No. 159836/1984. A method of using the adduct of dialkylphenol with alkylene oxide as the surface active agent, Japanese Laid-Open Patent Publication No. 226033/1984, is disclosed. However, even with these methods, a resol foam having an enough high closed-cell ratio, enough compact cellular structure and enough good heat resistance has not yet been obtained.

The inventors have conducted studies on surface active agents which can provide resole foams substantially improved as compared with those of the above-mentioned methods and as a result, have completed the present invention. The object of the invention is to provide resol foams having compact cellular structure, a high closed-cell ratio, and improved heat resistance.

SUMMARY OF THE INVENTION

This invention is concerned with the formation of resol type phenolic resin foam having a high closed-cell ratio, compact cellular structure and improved heat resistance. The method of manufacture includes foaming and curing a mixture of resol type phenolic resin having a number average molecular weight of 150–400, surface active agents, blowing agents and surface active agents of a silicone oil represented by formula A

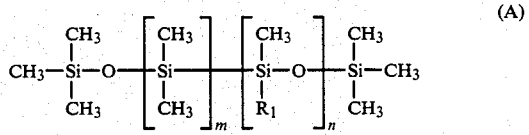

where $R_1$ is a saturated aliphatic hydrocarbon group of 8–14 carbon atoms and/or a 2-phenylpropyl group, m and n are integers and meet the requirement:

$$\frac{n}{n+m} = 0.2 \text{ to } 0.9;$$

and adducts of alkylphenol with ethylene oxide represented by formula B

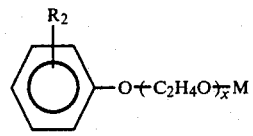

where $R_2$ is a saturated aliphatic hydrocarbon group of 4–12, carbon atoms, x is an integer of 4–110, and M is a hydrogen atom or a $-SO_2Na$ group. Members from both groups A and B are used as surface active agents in the preparation of the resol phenolic foam.

DETAILED DESCRIPTION OF THE INVENTION

The invention is characterized in that, in a method of manufacturing a phenol resin foam by foaming and curing a foamable material consisting of a resol type phenol resin, a surface active agent, a blowing agent, a curing agent, and the like, one or more types of surface active agents (A) of silicone oreoil represented by a general formula:

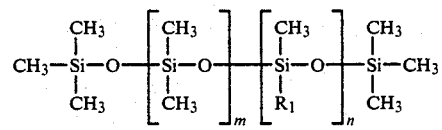

wherein $R_1$ is a saturated aliphatic hydrocarbon group of 8–14 carbon atoms and/or a 2-phenylpropyl group, and m and n are integers and meet the requirement:

$$\frac{n}{n+m} = 0.2 \text{ to } 0.9,$$

and one or more types of the adduct (B) of alkylphenol with ethylene oxide represented by a general formula

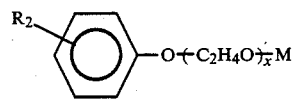

where $R_2$ is a saturated aliphatic hydrocarbon group of 4–12 carbon atoms, M is a hydrogen atom or $-SO_2Na$, and x is an integer of 4–110. Both are used as the surface active agents in the process.

In the surface active agent (A) of silicore oil for use in the invention, $C_8-C_{14}$ saturated aliphatic hydrocarbon group-substituted and/or 2-phenylpropyl group-substituted siloxane components account for 20–90% of the entire siloxane components. If the content of the substituted siloxane component is less than 20%, resol foams having a high closed-cell ratio cannot be obtained and if the content exceeds 90%, resol foams have coarse cells. With a saturated aliphatic hydrocarbon substituent group of 1–7 carbon atoms, resol foams having a high closed-cell ratio cannot be obtained, and with the same substituent group of 15 carbon atoms and over, resol foams have poor heat resistance.

In the adduct (B) of alkylphenol with ethylene oxide, the saturated aliphatic hydrocarbon substituent group ($R_2$) of 4–12 carbon atoms is used. However, of these, further preferably, nonyl group and tertiary octyl group each have a large effect of increasing the closed-cell ratio. If the carbon atom number of the substituent group is less than 4, resol foams have a lowered closed-cell ratio and if the carbon atom number exceeds 12, resol foams have lowered heat resistance. The mol number (x) of ethylene oxide added is 4–110, but the mol number of 25–100 is especially preferred. When x is less than 4, resol foams having compact cellular structure cannot be obtained and when x exceeds 110, resol foams have lower heat resistance. The nonionic type adduct (B) having the terminal group (M) of a hydrogen atom may be used or the anionic type adduct (B) having the terminal group (M) of $-SO_2Na$ may be used.

It is preferred that, as the mixing amount of the surface active agent, 0.1–10.0 parts by weight of the surface active agent (A) of silicone oil and 0.1–10.0 parts by weight of the adduct (B) of alkylphenol with ethylene oxide are both used based on 100 parts by weight of the resol type phenol resin. If the amount of either one or of each of the surface active agent (A) of silicone oil and the adduct (B) of alkylphenol with ethylene oxide exceeds 10.0 parts by weight, a resol foam having a high closed-cell ratio can be obtained but the resol foam has reduced mechanical strength and that resistance. If the amount of either one or of each of the surface active agent (A) of silicon oil and the adduct (B) of alkylphenol with ethylene oxide is less than 0.1 part by weight, resol foams having compact cellular structure cannot be obtained. Only by use of both of the surface active agent (A) of silicone oil and the adduct (B) of alkylphenol with ethylene oxide as the surface active agent, resol foams having compact cellular structure, a high closed-cell ratio, and good heat resistance can be obtained and by use of either one of the above-mentioned two, the desired resol foam cannot be obtained. The detailed reason for that is unknown. If the above-mentioned two, (A) and (B), are used, other conventional surface active agents may be combined with them.

The resol type phenol resin for use in the invention is prepared, for example, by a process characterized in that, after one of phenols is reacted with an aldehyde at a mol ratio of the former to the latter of 1:1 to 1:2.5 in the presence of an alkali catalyst, the reaction product is neutralized (to a pH value of 6–8) with an acid and, after that, is dehydrated. The resol type phenol resin has a number average molecular weight in a range of 150–400 and usually, a viscosity of 10–200 poises at 25°. If the number average molecular weight is smaller than 150, resol foams having compact cellular structure cannot be obtained and if it is larger than 400, the curing reaction rate is reduced so much that resol foams usable in practice cannot be obtained.

As usable phenols, there may be mentioned phenol, cresol, xylenol, ethylphenol, propylphenol, resorcinol, catechol, hydroquinone, bisphenol F, bisphenol A, and the like. As aldehydes usable, there may be mentioned formaldehyde, acetaldehyde, furfural, and the like. As the alkaline catalyst, lithium hydroxide, sodium hydroxide, potassium hydroxide, calcium hydroxide, barium hydroxide, or the like is, in general, usable. As the acid used for the neutralization, hydrochloric acid, sulfuric acid, phosphoric acid, boric acid, oxalic acid, acetic acid, lactic acid, phenol sulfonic acid, p-toluene sulfonic acid, or the like is usable.

As the blowing agent, the conventional blowing agents for preparation of resol foam can be used. For example, carbon tetrachloride, petroleum ether, isopropyl ether, normal pentane, trichloromonofluoromethane, dichlorodifluoromethane, nonochlorodifluoromethane, tetrachlorodifluororethane, trichlorotrifluoroethane, dichlorotetrafluoroethane, or a mixture of these is usable.

As the curing agent, an inorganic acid such as sulfuric acid, hydrochloric acid, or phosphoric acid, or an organic acid such as phenol sulfonic acid or p-toluene sulfonic acid can be used.

The manufacturing method for resol foams of the invention is characterized by use of both of the above-mentioned surface active agent (A) of silicone oil and adduct (B) of alkylphenol with ethylene oxide as the surface active agent. In the method, however, the desired resol foam can be manufactured by the conventionally known procedures, for example, by the procedure that, after a surface active agent is added and mixed with a liquid resol type phenol resin, a blowing agent is added and mixed, subsequently a curing agent is added, and, the resulting mixture is cast and heated to foam and cure. In addition, additives such as fire retardants and corrosion inhibitors can also be employed.

Resol foams obtained by the method of the invention have characteristics such as compact cellular structure, a high closed-cell ratio, good heat resistance, and a small water absorption ratio, so that they can be used as heat insulation materials and the like, for example, in a building material field.

The invention will be described in detail in examples hereinafter. However, the invention is not limited to these examples.

PREPARATION EXAMPLE 1

Preparation of Phenolic Resin

A four necked flask with a thermometer, a reflux cooler and a stirrer was charged with 1000 g of phenol, 1351 g of 37% formalin and 10 g of sodium hydroxide. After the reaction mixture was reacted at 80° C. for 3 hours, the reaction product was cooled to 40° C. and lactic acid was added to adjust its pH value to 7.0–8.0. Subsequently, the reaction product was dehydrated at 60° C. under reduced pressure and thus 1600 g of resol type phenol resin having a number average molecular weight of 320, a solid component content of 82%, and a viscosity of 70 poises at 25° C. was obtained.

PREPARATION EXAMPLE 2

Preparation of Phenolic Resin

A four-necked flask with a thermometer, a reflux cooler and a stirrer was charged with 100 g of phenol, 1208 g of 37% formalin and 10 g of sodium hydroxide. After the reaction mixture was reacted at 80° C. for 1.5 hours, the reaction product was cooled to 40° C. and lactic acid was added to adjust its pH value to 7.0–8.0. Subsequently, the reaction product was dehydrated at 60° C. under reduced pressure and thus 1450 g of resol type phenol resin having a number average molecular weight of 140, a solid component content of 80% and a viscosity of 50 poises at 25° C. was obtained The Examples 1, 2 and 3, and Comparative Examples 1–7 were formulated as shown in Table I.

Each formulated foamable material as shown in Table was weighed and placed in a polyethylene beaker and its temperature controlled to 20° C. It was stirred and mixed violently at 8000 rpm for 20 sec. Subsequently, the treated mixture was cast into an open top wooden mold lined with aluminum pre-heated to 80° C. to cause foaming, and then was further heated in an oven at 80°

C. for 15 min for curing. Thus, each resol foam was obtained. The obtained resol foam was removed from the oven and was cured at 23° C. for 10 days. After that, each resol foam sample was measured for the physical properties of foam.

Physical properties of these resol foams are shown in Table 1.

TABLE 1

|  | Example 1 | Example 2 | Example 3 | Compa. exam. 1 | Compa. exam. 2 | Compa. exam. 3 | Compa. exam. 4 | Compa. exam. 5 | Compa. exam. 6 | Compa. exam. 7 |
|---|---|---|---|---|---|---|---|---|---|---|
| Formulation for foamable material (g) | | | | | | | | | | |
| Phenol resin 1 (by manufg. example 1, n.a.m.w.: 320) | 100 | 100 | 100 | | 100 | 100 | 100 | 100 | 100 | 100 |
| Phenol resin 2 (by manufg. example 2, n.a.m.w.: 140) | | | | 100 | | | | | | |
| Silicone oil surface active agent 1 $\left( R_1: -C_{12}H_{25}, \frac{n}{m+n} : 0.67 \right)$ | 1 | 2 | 0.5 | 1 | 2 | | | | | 1 |
| Silicone oil surface active agent 2 $\left( R_1: -C_3H_6O-(C_2H_4O)_{16}CH_3, \frac{n}{m+n} : 0.33 \right)$ | | | | 1 | | | 2 | 1 | | |
| Alkylphenol-ethylene oxide adduct 1 ($R_2: -C_9H_{19}$, x: 85, M: H) | 1 | | 0.5 | 1 | | 2 | | 1 | | |
| Alkylphenol-ethylene oxide adduct 2 ($R_2: -C_9H_{19}$, x: 30, M: SO$_2$Na) | | 1 | | | | | | | | |
| Alkylphenol-ethylene oxide adduct 3 ($R_2: (-C_9H_{19})_2$, x: 30, M: H) | | | | | | | | | 2 | 1 |
| Blowing agent (Trichlorotrifluoroethane) | 10 | 10 | 10 | 10 | 10 | 10 | 10 | 10 | 10 | 10 |
| Curing agent (aq. 67% phenol sulfonic acid soln.) | 15 | 15 | 15 | 15 | 15 | 15 | 15 | 15 | 15 | 15 |
| Physical properties of foam | | | | | | | | | | |
| Foam density (kg/m$^3$, based on JIS A-9514) | 36 | 37 | 35 | 28 | 37 | 35 | 36 | 35 | 35 | 36 |
| Cellular structure (visual inspection for core parts of foam) | Compact | Compact | Compact | Coarse | Compact | Compact | Compact | Compact | Compact | Compact |
| Closed cell ratio (%, based on ASTM D 2856) | 97 | 95 | 96 | 18 | 81 | 74 | 58 | 67 | 70 | 75 |
| Water absorption ratio (g/100 cm$^2$, based on JIS A 9514) | 2.5 | 2.7 | 3.2 | 10.8 | 8.7 | 8.5 | 8.8 | 6.5 | 8.5 | 6.2 |
| Heat resistance* | Good | Good | Good | Bad | A little | A little | Bad | A little | Bad | A little |

TABLE 1-continued

|  | Example 1 | Example 2 | Example 3 | Compa. exam. 1 | Compa. exam. 2 | Compa. exam. 3 | Compa. exam. 4 | Compa. exam. 5 | Compa. exam. 6 | Compa. exam. 7 |
|---|---|---|---|---|---|---|---|---|---|---|
|  |  |  |  | good | good |  | good |  | good |  |

Explanatory Notes for Table 1
*Test method for heat resistance:
A test piece having dimensions of 100 × 100 × 25 mm is heated from 2 cm just below it for 1 min with a Bunsen burner flame controlled to have an inner flame height of 1.5 cm and an outer flame height of 4.0 cm and then deformation or cracks of the test piece are observed. A sample whose test piece deforms only a little and does not crack is taken as good.
n.a.m.w.: Number average molecular weight
Silicone oil surface active agent 1:

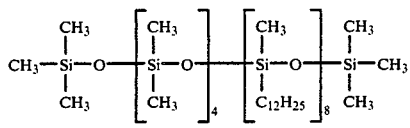

Silicone surface active agent 2:

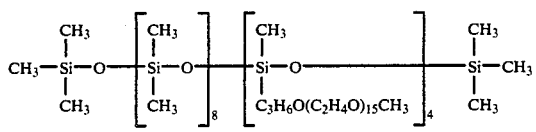

Alkylphenol-ethylene oxide adduct 1:

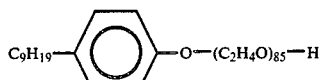

Alkylphenol-ethylene oxide adduct 2:

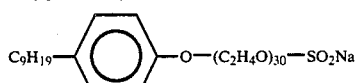

Alkylphenol-ethylene oxide adduct 3:

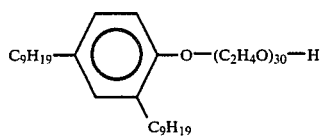

We claim:

1. A method for the manufacturing of phenol resin foam comprising foaming and curing a resole phenolic resin having a number average molecular weight of 150–400, surface active agents, blowing agents, and curing agents, wherein surface active agents are selected from each of the general formulas A and B and may be one or more types of each represented by

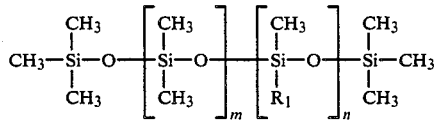

where $R_1$ is a saturated aliphatic hydrocarbon group of 8–14 carbon atoms and/or a 2-phenylpropyl group, m and n are integers meeting the requirement:

$$\frac{n}{n+m} = 0.2 - 0.9,$$

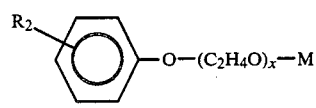

where $R_2$ is a saturated aliphatic hydrocarbon group of 4–12 carbon atoms, M is a hydrogen atom or $-SO_2Na$, X is an integer of 4–110, and the amount of surface active agent A used is 0.1–10 parts by weight, and surface active agent B used is 0.1–10 parts by weight based on the weight of the resole phenolic resin.

2. The method of manufacturing phenolic resin foam according to claim 1, wherein in surface active agent B, the saturated aliphatic hydrocarbon group $R_2$ contains 8 or 9 carbon atoms.

3. The method of manufacturing phenolic resin foam according to claim 1, wherein in surface active agent B, the mol number of the ethylene oxide group, x, is 25–100.

4. The method of manufacturing phenolic resin foam according to claim 1 wherein the blowing agent is trichlorotrifluoroethane.

5. The method of manufacturing phenolic resin foam according to claim 1 wherein the curing agent is phenol sulfonic acid.

6. A method for the manufacture of phenol resin foam comprising foaming and curing a resole phenolic resin having a number average molecular weight of 150–400, surface active agents, blowing agents, and curing agents, wherein a surface active agent is selected from each of the following general formulae A and B:

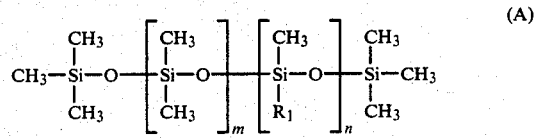
(A)

where $R_1$ is a saturated aliphatic hydrocarbon group of 8–14 carbon atoms and/or a 2-phenylpropyl group, m and n are integers meeting the requirement:

$$\frac{n}{n+m} = 0.2 = 0.9,$$

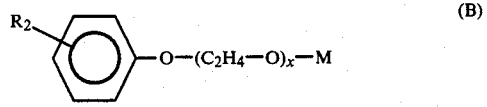
(B)

where $R_2$ is a saturated hydrocarbon group of 8 or 9 carbon atoms, M is a hydrogen or $-SO_2Na$, X is 25–100, and the amount of A used is 0.1–10 parts by weight and the amount of B used is 0.1–10 parts by weight based on the weight of the resole phenolic resin.

7. The method of manufacturing phenolic foam according to claim 6, wherein the blowing agent is trichlorotrifluoroethane.

8. The method of manufacturing phenolic foam according to claim 6, wherein the curing agent is phenolsulfonic acid.

9. The phenol resin foam manufactured by the method of claim 1.

10. The phenol resin foam manufactured by the method of claim 6.

* * * * *